W. Hedges.
Evaporating Pan.
No. 1,348. Reissued Oct. 28, 1862.
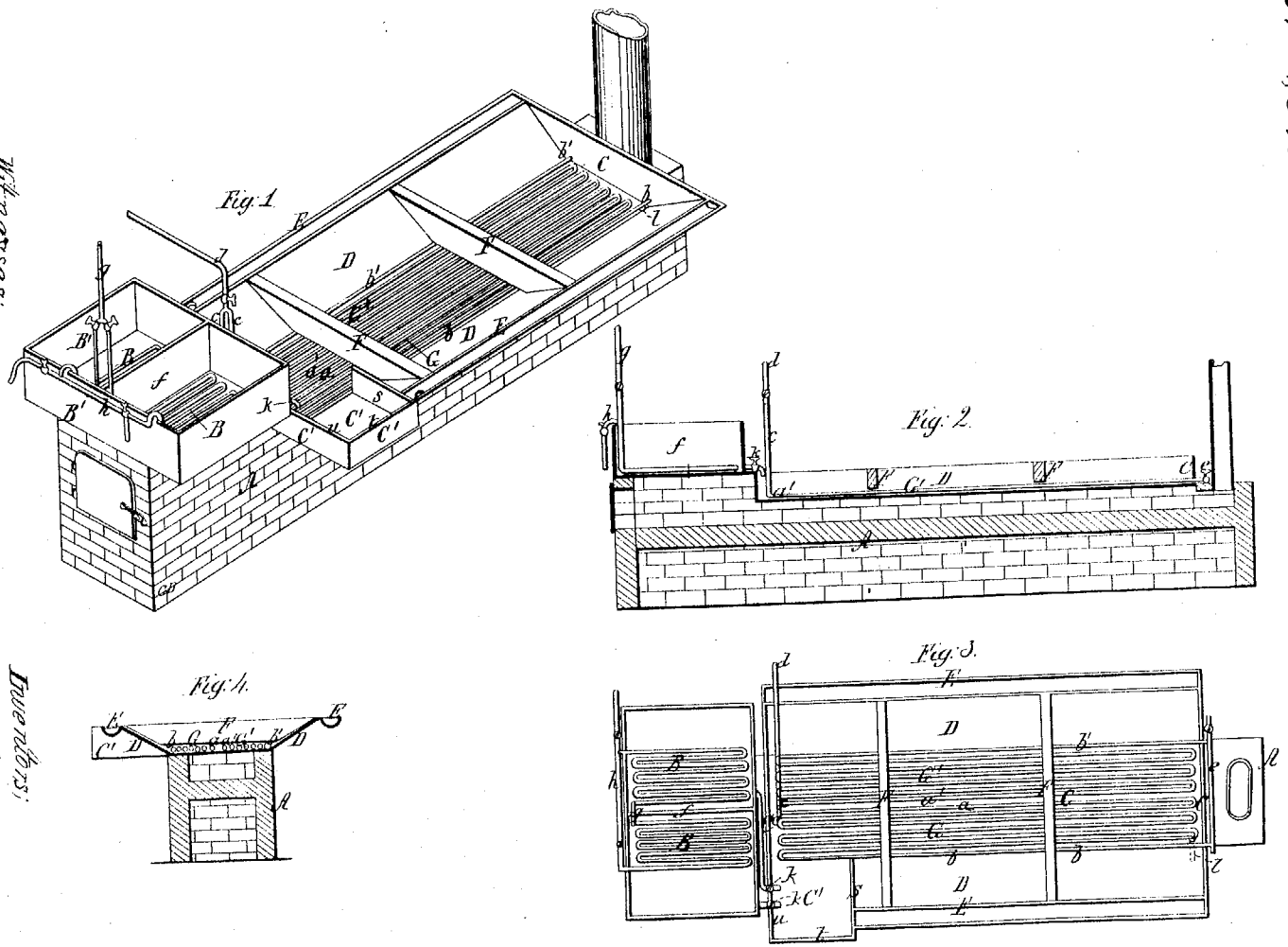
Witnesses;
Gustave Dieterich
De Witt C. Fauntleroy
Inventors;
W. W. Yates. Thomas Chalmers & David R. Fraser.
assignees of Wheeler Hedges W. W. Yates.
by Fraser Fennell & Fauntleroy
Attys.
N. PETERS, PHOTO-LITHOGRAPHER, WASHINGTON, D. C.

UNITED STATES PATENT OFFICE.

P. W. GATES, THOS. CHALMERS, AND DAVID R. FRASER, OF CHICAGO, ILLINOIS, ASSIGNEES, BY MESNE ASSIGNMENTS, OF WHEELER HEDGES, OF SAME PLACE.

IMPROVEMENT IN APPARATUS FOR EVAPORATING SUGAR JUICES AND SOLUTIONS.

Specification forming part of Letters Patent No. 26,325, dated November 29, 1859; Reissue No. 1,318, dated October 28, 1862.

DIVISION NO. 2.

*To all whom it may concern:*

Be it known that WHEELER HEDGES, of Chicago, in the county of Cook and State of Illinois, did invent a new and Improved Mode of Evaporating Sugar and Sirup Juices, for which Letters Patent were granted to WHEELER HEDGES and P. W. GATES, as assignees of his sole right, title, and interest therein, which Letters Patent were again assigned to P. W. GATES, THOMAS CHALMERS, and DAVID R. FRASER, of the city, county, and State above named; and we, the undersigned, assignees as aforesaid, believing that the said patent is inoperative and invalid by reason of a defective specification, which defect has arisen from inadvertence and mistake, do hereby surrender the same, and file amended specifications, and request that new Letters Patent, under Divisions numbered 1, 2, 3, and 4, may be issued to us for the same invention for the residue of the period for which the original patent was granted on the said amended specifications, which, together with the accompanying drawings, we do hereby declare to be a more full, clear, and exact description of the said WHEELER HEDGES's new and improved mode of evaporating sugar and sirup juices.

Figure 1 of the drawings is a perspective view, Fig. 2 a longitudinal section, Fig. 3 a plan, and Fig. 4 a cross-section, of the apparatus.

The nature of the invention embraced under this patent consists, first, in the combination of a pan with inclined side beaches and flat bottom, and the transverse stops which have a narrow passage for the purified juice between them and the bottom of the pan, the said stops serving to prevent the rapid passage of foam from the front to the rear end of the pan, and at the same time allow the juice the full width of the stream to flow freely by the aid of the slight inclination of the bottom of the pan and hydrostatic pressure, the inclined side beaches at the same time serving as a broad receiver for the foam arrested by the stops.

It consists, second, in the combination of the stops, the pan, and the defecator, which latter element of the combination serving as a means whereby to separate the green scum from the juice before the boiling thereof sets it.

It consists, third, in the combination of the coils receiving steam at the center of the width of the pan, with the pan and the fire-furnace, whereby the evaporation may be effected in a very thorough manner through the agency of steam and flame, and the separation of feculent matter from the juices accomplished expeditiously and completely.

It consists, fourth, in the combination of deep preparatory heaters with steam-coils in them and arch under them, and the evaporating-pan constructed with inclined side beaches, and steam-coils which receive the steam near the center of the pan.

It consists, fifth, in the combination of the preparatory steam-coil heaters and the defecator of the evaporating-pan.

It consists, sixth, in the arrangement of the two sets of coils, two chambers, and the receiving and exhaust-steam pipes and the sirup-cocks of the preparatory heaters.

It consists, seventh, in the combination of the evaporating-pan with steam-coils, as described, and inclined side beaches, and the gutters for receiving the scum or feculent matter.

It consists, eighth, in the combination of side beaches and gutters.

To enable others skilled in the art to make this invention, we will proceed to describe the same with reference to the drawings.

A is a fire arch or furnace, made of brick or other material, with chimney-flue, doors, and dampers in accordance with any of the known modes of building such structures.

B B are two preparatory steam-coil heaters, inclosed by two rectangular preparatory cleansing-chambers, B′ B′, the partition *f* between said chambers separating the coils from one another. These chambers and coils are arranged on the highest front portion of the top of the arch. The receiving ends of the steam-coils connect with a common supply-pipe, *g*, of a steam-generator, and the exhaust ends connect with a common exhaust-pipe, *h*. The supply and exhaust are regulated by suitable cocks. The chambers B′ are provided with let-off cocks *k k*, by which the juice, after being properly heated, is let into the defecator of the pan.

C C′ represent the pan and defecator. The defecator is situated laterally to the pan, but its bottom is a continuation or part of the pan-bottom. The sides D of the pan rise up from the bottom thereof on an incline plane, while the boards which inclose the defecator *s t u* on three sides, and also the boards which form the ends of the pan, are vertical, or nearly so. This pan is located so as to be on a slight incline downward upon the lower part of the arch in rear of the preparatory heaters. Thus arranged, the cocks *k* of the preparatory heaters are over the defecator and lead into it. The defecator is also outside of the inner margin of the fire-flue of the arch. So, also, are the inclined sides of the evaporator-pan, as shown in Fig. 4. The arch-wall, however, should be built out under the defecator.

On the bottom of the pan two steam-coils, G G′, are arranged, as shown or as described in Division No. 1 of this reissue. These coils, as here shown, receive steam first through the parts *a a′* and pass it along until it escapes from *b b′* into the exhaust-pipe *e*. The receiving ends of the coils connect with a common supply, *d*, of a steam-generator. Both the supply and the exhaust are controlled by cocks, as represented.

Across the coils, and resting on the inclined inner sides of the pan, should be arranged one or more stop-boards, F F. Beneath these boards a narrow space the length of the width of the pan-bottom exists, so that while the boards prevent the passage of the scum to the rear end of the pan the juice, deprived of more or less of its impurities, may have a free course from one end of the pan to the other, its passage being below the stop-boards. At the extreme rear end of the pan a discharge-gate or faucet, *l*, is provided, and on the under edges of the inclined sides of the pan gutters E E to receive the scum that is scraped off the beaches D D are arranged.

To use the invention described for evaporating juice for making sirup or sugar, fill the preparatory heaters and cleansers B B′. Then let the steam into the pipes B B. When the juice is sufficiently heated, draw it into the defecator C′ and pan C until the coils G G′ are nearly covered. Then let the steam into the pipes G G′, when a powerful ebullition will commence, and by reason of the direct steam entering the middle pipes, *a a′*, first, the juice immediately about them will be the hottest, and owing to this and the isolated position of the inclined sides D D the foam will be caused to rise highest in the middle of the pan and to flow toward and upon the sides D D, where the scum will deposit, and can be removed with a scraper into the troughs E. Thus is effectually eradicated from the juice all substances that would injure the quality of the sirup or sugar, which end is also greatly aided by the defecator, which, by reason of its remoteness from the intense flame-heat, does not heat the juice to the boiling-point as it flows through it, although keeping it near that point; consequently as fast as the juice falls in an almost immediate and perfect defecation takes place, and the green scum being prevented from flowing out of the defecator by the strong current of ebullition setting in, the operator is enabled to remove the scum before it is boiled into the sirup.

It is well known that to make good sirup or sugar the evaporation should be rapid; therefore the advantage of a combination of flame and steam, as shown, so as to facilitate the process as required, will be apparent, and especially the manner shown of introducing the steam at the very point where the heat should be the greatest; and, besides this, should the steam apparatus become injured by accident, or could not be used conveniently, the fire-furnace could be used alone to meet any such emergency. After the evaporation has proceeded a short time, the sirup as the discharging end of the pan will be of a proper density to draw off by means of the faucet *l*, and having started the process, the supply and discharge must be closely watched, so as to prevent scorching, always endeavoring to keep the sirup about an inch deep, or thereabout, in the pan.

What is claimed under this patent is—

1. The combination of the transverse stops F F and the pan C, with inclined sides, the stops having a narrow flow-passage equal to the width of the bottom of the pan beneath them, substantially as and for the purpose set forth.

2. The combination of the stops F F, the pan C, and defecator C′, substantially as and for the purpose set forth.

3. The combination of the coils G G′, operating as described, or in a manner equivalent thereto, the pan C, and the fire-furnace A, substantially as and for the purpose set forth.

4. The combination of the deep preparatory heaters B B′, the shallow evaporating-pan C D, and steam-coils G G′, or equivalents thereof, and fire-arch A, substantially as and for the purpose described.

5. The combination of the preparatory heaters and cleansers B B′ and the defecator C′, substantially as and for the purpose described.

6. The arrangement of the two sets of coils B B, two chambers, B′ B′, and the receiving and exhaust steam-pipes *g h*, and the sirup-cocks *k k*, substantially as and for the purpose set forth.

7. The combination of the evaporating-pan C, steam-coils G G′, or their equivalents, inclined side beaches, D D, and gutters E E, substantially as and for the purpose described.

8. The combination of the inclined beaches D D and the gutters E E, substantially as and for the purpose described.

P. W. GATES.
THOS. CHALMERS.
DAVID R. FRASER.

Witnesses:
WILL A. PRALL,
J. L. FORYO.